United States Patent
Simmons

(10) Patent No.: US 9,428,333 B2
(45) Date of Patent: Aug. 30, 2016

(54) COMPRESSED NATURAL GAS VEHICLE APPARATUS AND METHOD

(71) Applicant: Casella Waste Systems, Inc., Rutland, VT (US)

(72) Inventor: Gary Simmons, Pittsford, VT (US)

(73) Assignee: Casella Waste Systems, Inc., Rutland, VT (US)

( * ) Notice: Subject to any disclaimer, the term of this patent is extended or adjusted under 35 U.S.C. 154(b) by 0 days.

(21) Appl. No.: 14/800,420

(22) Filed: Jul. 15, 2015

(65) Prior Publication Data

US 2015/0316212 A1    Nov. 5, 2015

Related U.S. Application Data

(62) Division of application No. 13/414,631, filed on Mar. 7, 2012, now Pat. No. 9,114,930.

(60) Provisional application No. 61/450,027, filed on Mar. 7, 2011.

(51) Int. Cl.
  *B65D 25/00*    (2006.01)
  *B65F 3/00*    (2006.01)
  (Continued)

(52) U.S. Cl.
  CPC .................. *B65F 3/00* (2013.01); *B60K 15/07* (2013.01); *F17C 13/084* (2013.01); *B60K 2015/0319* (2013.01); *B60K 2015/03118* (2013.01); *B60K 2015/0637* (2013.01); *B60K 2015/0639* (2013.01); *B60Y 2200/144* (2013.01); *B65F 2003/0279* (2013.01); *F17C 2201/0109* (2013.01); *F17C 2201/035* (2013.01); *F17C 2201/056* (2013.01); *F17C 2205/013* (2013.01); *F17C 2205/0142* (2013.01);
  (Continued)

(58) Field of Classification Search
  CPC .......... B60K 2015/0639; B60K 15/07; B60K 15/06; B60K 2015/0637; B60K 2015/03118; B60K 2015/0319; B65F 3/00; B65F 2003/0279; F17C 13/084; F17C 2270/0171; F17C 2201/035; F17C 2201/056; F17C 2201/0109; F17C 2205/0142; F17C 2221/033; F17C 2223/0123; F17C 2223/036; F17C 2205/0157; B60Y 2200/144; B60R 9/04

See application file for complete search history.

(56) References Cited

U.S. PATENT DOCUMENTS 2,635,939 A * 4/1953 Obenchain .............. B60R 11/00
                                             211/76
3,912,239 A * 10/1975 Ries ...................... B28C 5/4231
                                             366/40

(Continued)

*Primary Examiner* — Brodie Follman
*Assistant Examiner* — Brian Cassidy
(74) *Attorney, Agent, or Firm* — Wilmer Cutler Pickering Hale and Dorr LLP

(57) ABSTRACT

Systems and methods for installing a compressed natural gas housing apparatus to a vehicle are disclosed. The housing apparatus is configured to be retrofitted to existing cab liners used on refuse vehicles. The complete installation of the housing apparatus and roof liner are disposed below the roofline of the refuse vehicle. The housing apparatus can be configured to contain a variable number of compressed natural gas tanks. The housing apparatus is installed such that the length of the gas pipeline and electrical wiring connected to the apparatus from the vehicle engine and controller is minimized. The location of housing apparatus provides the additional safety of minimizing the exposure of the gas tanks to falling debris or prevent possible contact with the compressed natural gas tanks being damaged as vehicle travels under bridges, other low objects, or contact in the event of a rollover accident.

9 Claims, 12 Drawing Sheets

(51) Int. Cl.
*B60K 15/07* (2006.01)
*F17C 13/08* (2006.01)
*B60K 15/063* (2006.01)
*B60K 15/03* (2006.01)
*B65F 3/02* (2006.01)

(52) U.S. Cl.
CPC .... *F17C 2205/0157* (2013.01); *F17C 2221/033* (2013.01); *F17C 2223/0123* (2013.01); *F17C 2223/036* (2013.01); *F17C 2270/0171* (2013.01); *Y10T 29/49119* (2015.01); *Y10T 29/49826* (2015.01)

(56) References Cited

U.S. PATENT DOCUMENTS

| | | | | |
|---|---|---|---|---|
| 5,054,799 A * | 10/1991 | Fingerle | B62D 35/001 | 280/164.1 |
| 5,443,578 A * | 8/1995 | Davis, Jr. | B60K 15/03006 | 220/581 |
| 5,518,272 A * | 5/1996 | Fukagawa | B60K 15/07 | 180/69.5 |
| 5,632,250 A * | 5/1997 | Kato | F02D 41/0027 | 123/198 DB |
| 5,673,939 A * | 10/1997 | Bees | B60K 1/04 | 280/831 |
| 5,681,140 A * | 10/1997 | Christenson | B30B 9/301 | 414/406 |
| 5,810,309 A * | 9/1998 | Augustine | B60K 15/07 | 248/154 |
| 5,924,734 A * | 7/1999 | Fukagawa | B60K 15/07 | 220/4.14 |
| 6,071,057 A * | 6/2000 | Duron | B65F 3/201 | 414/406 |
| 6,095,367 A * | 8/2000 | Blair | B60K 15/03006 | 220/23.2 |
| 6,112,760 A * | 9/2000 | Scott | F17C 13/084 | 137/255 |
| 6,257,360 B1 * | 7/2001 | Wozniak | B60K 15/013 | 180/69.5 |
| 6,321,775 B1 * | 11/2001 | Hildebrand | B60K 15/013 | 137/266 |
| 6,502,660 B1 * | 1/2003 | Scott | B60K 15/013 | 137/267 |
| 6,676,163 B2 * | 1/2004 | Joitescu | B60K 15/07 | 280/834 |
| 6,692,028 B2 * | 2/2004 | Koster | B60K 1/04 | 220/562 |
| 7,063,355 B2 * | 6/2006 | Hashimura | B60K 15/063 | 280/830 |
| 7,137,474 B2 * | 11/2006 | Yokote | F17C 13/084 | 180/314 |
| 7,198,301 B2 * | 4/2007 | Wozniak | B60G 3/06 | 280/830 |
| 7,243,999 B2 * | 7/2007 | Lacerda, Jr. | B60P 3/14 | 298/17 R |
| 7,270,209 B2 * | 9/2007 | Suess | B60K 15/03006 | 180/69.5 |
| 7,434,611 B2 * | 10/2008 | Wunderlich | B60H 1/00207 | 165/202 |
| 7,458,611 B2 * | 12/2008 | Hashimura | B60K 15/063 | 280/830 |
| 7,543,667 B2 * | 6/2009 | Hwang | H01M 8/04201 | 180/314 |
| 7,624,753 B2 * | 12/2009 | Suess | B60K 15/03006 | 137/259 |
| 7,882,587 B2 * | 2/2011 | Tagliaferri | B60K 15/063 | 15/340.1 |
| 7,976,067 B2 * | 7/2011 | Naganuma | B60H 1/00371 | 180/69.2 |
| 8,302,997 B2 * | 11/2012 | Veenstra | B60K 15/07 | 137/267 |
| 8,534,403 B2 * | 9/2013 | Pursifull | B60K 15/07 | 180/314 |
| 8,613,201 B2 * | 12/2013 | Bayliff | F17C 7/00 | 60/648 |
| 8,690,191 B2 * | 4/2014 | Gentry | B60J 7/1607 | 280/834 |
| 8,807,256 B2 * | 8/2014 | Gibb | F17C 1/00 | 180/69.5 |
| 8,881,933 B2 * | 11/2014 | Green | B60K 15/07 | 220/605 |
| 8,915,322 B2 * | 12/2014 | Gibb | F17C 1/00 | 180/314 |
| 2002/0117123 A1 * | 8/2002 | Hussain | B82Y 30/00 | 123/3 |
| 2002/0171236 A1 * | 11/2002 | Joitescu | B60K 15/07 | 280/834 |
| 2006/0032532 A1 * | 2/2006 | Suess | B60K 15/03006 | 137/266 |
| 2006/0033322 A1 * | 2/2006 | Suess | B60K 15/03006 | 280/830 |
| 2008/0156809 A1 * | 7/2008 | Mizuno | B60K 15/07 | 220/562 |
| 2009/0071174 A1 * | 3/2009 | Hylands | F17C 5/007 | 62/53.2 |
| 2009/0317219 A1 * | 12/2009 | Pruteanu | B65F 3/041 | 414/408 |
| 2010/0078244 A1 * | 4/2010 | Pursifull | B60K 15/07 | 180/69.5 |
| 2011/0288738 A1 * | 11/2011 | Donnelly | F02D 19/0697 | 701/99 |
| 2012/0280481 A1 * | 11/2012 | Gentry | B60J 7/1607 | 280/834 |
| 2013/0069357 A1 * | 3/2013 | Green | B60K 15/067 | 280/834 |
| 2014/0061266 A1 * | 3/2014 | Milton | F17C 5/06 | 224/404 |
| 2014/0069972 A1 * | 3/2014 | Willemsen | B60K 15/07 | 224/401 |
| 2014/0251479 A1 * | 9/2014 | Gibb | F17C 1/00 | 137/899 |
| 2015/0112506 A1 * | 4/2015 | Hanlin | F02M 21/029 | 701/1 |

* cited by examiner

COMPRESSED NATURAL GAS VEHICLE APPARATUS AND METHOD

CROSS REFERENCE TO RELATED APPLICATIONS

This patent application is a divisional of U.S. patent application Ser. No. 13/414,631, filed Mar. 7, 2012, which claims priority under 35 U.S.C. §111 to U.S. Provisional Patent Application No. 61/450,027, filed Mar. 7, 2011, which is incorporated herein by reference in its entirety.

FIELD OF THE INVENTION

The present invention generally relates to compressed natural gas (CNG) powered vehicles, e.g., refuse route vehicles such as waste collection, waste transfer, and recycling vehicles. More particularly, the present invention relates to installation of CNG cylinders in order to improve safety, maintenance, operation, reduce aerodynamic drag and fuel consumption of a vehicle.

BACKGROUND

Conventional refuse route vehicles, which are mostly operated with diesel fuel, are one of the most inefficient vehicles on the road. This vehicle type has the additional economic detriment that diesel fuel is primarily produced from imported foreign oil. During operation, the vehicles are used to pickup household and commercial trash and recyclables across communities, which leave behind some air pollutants (e.g., $SO_x$, $NO_x$, and VOCs) and soot while generating as much as 100 decibels of noise.

Refuse route vehicles that operate on natural gas rather than diesel fuel can have quality of life benefits and benefit vehicle fleet operators. There is also an economic benefit to using natural gas, as use of the primarily domestically produced natural gas increases the nation's energy security. Since natural gas is plentiful within the U.S., it is not only less expensive than diesel fuel, but also reduces the threat of an oil price spike or supply disruptions. Based on U.S. Environmental Protection Agency (EPA) and Department of Energy (DOE) studies, CNG trucks produce 75% lower carbon monoxide emissions, 49% lower nitrogen oxides emissions, 24% lower greenhouse gas emissions, and 95% lower particulate matter emissions than similarly sized diesel trucks.[1] Natural gas fueled refuse vehicles also produce approximately 70-80 less decibels inside the vehicle.[2]

[1] http://www.afdc.energy.gov/afdc/vehicles/emissions_natural_gas.html
[2] Baruch College with Council on the Environment of New York City, "Neighborhood Noise and its Consequences," December 2004

There are several benefits of using natural gas to power vehicles. For example, natural gas costs are approximately one-third lower than that of gasoline. Natural gas prices have exhibited significant stability compared to oil prices, which makes it easier to plan accurately for long-term costs.

CNG powered refuse route vehicles are currently operational. Typically, these vehicles use 4 or 6 high pressure cylinders, approximately 3,600 psig, to store natural gas. As shown in FIG. 1 for a front load vehicle, vehicle 100 comprises cylinders or tanks 101 that are securely installed at the back end on the roof 102 of the body 107, about 13-13.5 ft from the ground. Cab protector 105 is attached to the front face 109 of body 107. Gas pipelines (not shown), which deliver fuel to the engine and refueling tanks (not shown), and electric wires (not shown) for valve control are routed from the cylinders to the location of the vehicle's engines.

FIG. 1A shows an alternative prior art design. Rear loading vehicle 150 includes rear loading mechanism 152 and tank enclosure 151. Notably, a plurality of CNG tanks (not shown) is installed inside of enclosure 151. Tank enclosure 151 is coupled to front face 154 of vehicle body 155. Due to the height of enclosure 151, which is parallel to roofline 153 of vehicle, additional aerodynamic drag is created when the vehicle is in motion. This reduces overall fuel efficiency in the operation of vehicle 150.

FIG. 1B demonstrates the conventional tank enclosure 151 shown in FIG. 1A. CNG tanks (now shown) are configured to fit inside of enclosure 151. As shown in FIG. 1A, the tank enclosure can be coupled, e.g., bolted, welded, etc., to the front face 154 of vehicle body. Brackets 156 are used to attach enclosure 151 to the body 155b of a refuse vehicle. Access panels 158 are used to allow access to valve mechanisms disposed on one end of each CNG tank. Knob 158a is manipulated to open panels 158. Hinges 158b are used to allow panel 158 to open and close. Vehicle operators may manually manipulate valve mechanism to turn on or off the flow of natural gas from the CNG tanks.

Once installed, the rear portion 159a of the tank enclosure 151 faces the front face 154 of body 155b of vehicle. The front portion 159c is configured to fit above vehicle cab 155a. In this conventional design, tank enclosure 151 prevents falling debris from entering CNG tank apparatus. Entry of debris into CNG tank apparatus could damage or dislodge CNG tanks. A damaged or dislodged tank could lead to catastrophic failure such as vehicle fire. However, as vehicle travels in a forward direction, a strong wind vortex will be formed in the L-shaped space of 159c. Consequently leads to an increased drag resistance so the fuel efficiency is reduced.

There are several detriments associated with this prior art design of CNG tank installations. As the tanks 101 are installed on the roof top 102 of vehicle 100, the high elevation of vehicle 100 increases aerodynamic drag, which increases fuel consumption and creates potentially serious safety concerns. For example, as vehicles travel through communities, under bridges, elevated walkways, trees, telephone and electric power lines, the CNG tanks are exposed to possible contact with these objects. Furthermore, as refuse is picked up by front loader mechanism 104 and raised over cab 108, cap 105, sliding door 106 is slid toward the rear of vehicle 100 and refuse is placed into the body portion 107 of the vehicle. This process often allows waste to wipe into tank area 101. Also, as the engine (not shown) is located near the rear of the cab 108 and the tanks are located on the rear top portion of the body 107, a long and complex gas pipeline route and electric wires are required to run on both sides of the truck for delivery of natural gas, refueling and electrical connection. This complexity greatly increases the cost of installation, maintenance and service.

Consequently, there is a need for a method to design, install and operate the CNG tanks on refuse route vehicles that would prevent the shortcomings of previous designs.

SUMMARY OF EXEMPLARY EMBODIMENTS OF THE INVENTION

Method and apparatus for improving compressed natural gas powered vehicles are described.

According to an exemplary aspect, a method of installing a plurality of compressed natural gas tanks to a vehicle is provided. The method comprises providing an apparatus to house a plurality of CNG tanks, installing the plurality of CNG tanks in the interior of the apparatus, installing the apparatus on a front portion of the body of the vehicle and below the roof line of the vehicle, connecting the CNG tanks to the engine of the vehicle, and connecting the CNG tanks to a controller of the vehicle.

In the preceding embodiment, the apparatus is configured to couple to a tank enclosure apparatus of the vehicle.

In the preceding embodiments, the tank enclosure apparatus is configured to attach to the body of the vehicle.

In any of the preceding embodiments, the plurality of CNG tanks comprises at least one tank but typically three tanks or more.

In any of the preceding embodiments, gas from the plurality of CNG tanks is transported to the engine of the vehicle via at least one pipeline.

In any of the preceding embodiments, providing an electrical connection between the plurality of CNG tanks and a control mechanism of the vehicle.

In any of the preceding embodiments, installing the apparatus proximate the engine of the vehicle.

In any of the preceding embodiments, installing the apparatus proximate the control mechanism of the vehicle.

In any of the preceding embodiments, using a manifold device to transfer natural gas from the CNG tanks.

According to an exemplary embodiment, a compressed natural gas tank apparatus configured to house at least one CNG tank is provided. The apparatus is configured such that it can be attached to the body of a vehicle. The apparatus is also configured to be retrofitted to a previously installed cab protector, attached to the body of a CNG powered vehicle.

In the preceding embodiment, the apparatus comprises metal components.

In any of the preceding embodiments, the apparatus is configured to be attached to a manifold device.

In the preceding embodiment, the manifold device is configured to transfer natural gas from the at least one CNG tank to the engine of the CNG powered vehicle.

In any of the preceding embodiments, the at least one CNG tank is rated at least 21 diesel gallon equivalents.

BRIEF DESCRIPTION OF THE DRAWINGS

The invention is described with reference to the following figures, which are provided for the purpose of illustration only, the full scope of the invention being set forth in the claims that follow.

DETAILED DESCRIPTION OF EXEMPLARY, NON-LIMITING EMBODIMENTS OF THE INVENTION

Exemplary embodiments of the present invention provide a CNG tank installation design and method. The use of the design provides an economic benefit as the components used are easier to manufacture and the installation procedure is less complex. Additionally, exemplary embodiments of the present invention provide for a more cost effective operation of a CNG vehicle. One or more embodiments of the invention can also be used on any other suitable battery cells beyond those described herein.

Figure 2:
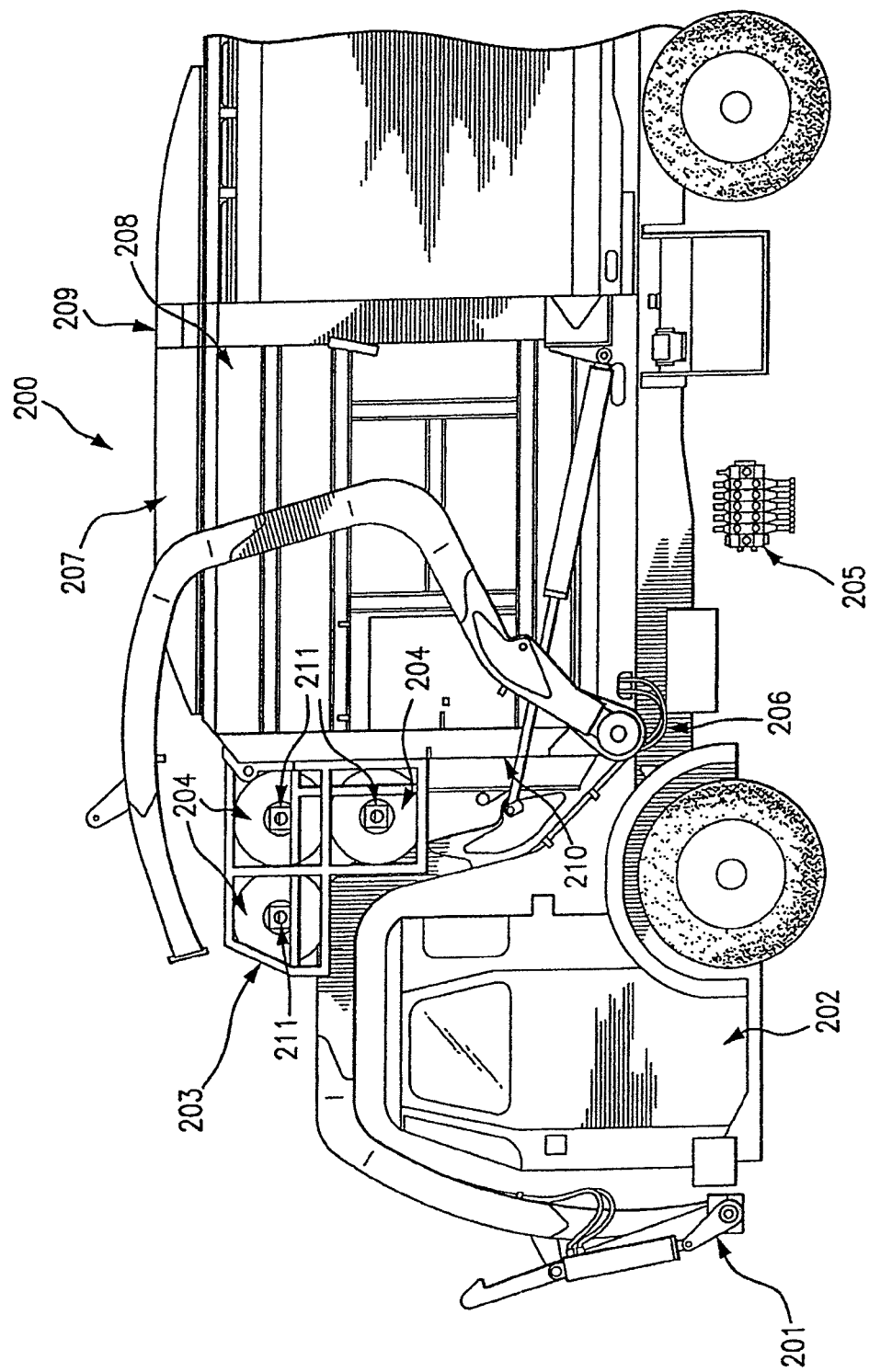
FIG. 2 is a schematic diagram of a CNG front loading refuse route vehicle in accordance with an exemplary aspect of the invention.

FIG. 2 illustrates a CNG vehicle according to exemplary aspects of the present invention. As shown in FIG. 2, vehicle 200 has a CNG tank installation 203 mounted behind cab 202. The location of the tank assembly 203 is between the cab 202 and the vehicle main body 208, with its top surface below the vehicle roofline 209. The feature of this design increases vehicle fuel efficiency as aerodynamic drag is reduced when compared to prior designs where tanks were installed on the roof of a vehicle in case of a front loading vehicle. Or, in the case of rear or side loading vehicles where tanks are installed in a configuration parallel to the roof line of the vehicle, aerodynamic drag is similarly not reduced. In operation, front loading mechanism 201 is used to pick up a refuse container and move it to a rearward portion of vehicle 200. Door 207 opens and the refuse is placed inside body 208 of vehicle 200. The location of tank assembly 203, which is below the roof line 209 of vehicle 200, allows enough clearance for the refuse container (not shown) to pass tank assembly without refuse entering tank assembly. The location of tank assembly 203 prevents the possibility of the CNG tanks being damaged as the vehicle travels under bridges, tree branches, utility grid and telephone wires, and other obstacles that may be contacted during a typical refuse vehicle route. One of ordinary skill in the art would appreciate that the location of assembly 203 allows for more convenient pre and post trip driver inspection of vehicle, which is required by the U.S. Department of Transportation. In contrast to prior vehicle designs, the driver, according to the present design, is not required to climb to the top of vehicle in order to inspect CNG tanks, which results in less exposure to falls from the vehicle by the driver.

Furthermore, the location of the CNG tank apparatus 203, i.e., below the roof line of vehicle 200 and between the cab 202 and the vehicle body 208, reduces overall body aerodynamic drag. Vehicles configured according to the present invention demonstrate improved fuel efficiency in accordance with the installation location of tank apparatus 203. Hydraulic components 205, which control and manipulate front loading mechanism 201, is located under vehicle 200. In conventional designs, the hydraulic assembly is located between the cab and body of vehicle. Due to the installation of assembly 203, components 205 is located under vehicle 200. Hydraulic lines 206 are attached to assembly 205 (not shown) on one end and mechanism 201 on opposite end.

Engine (not shown) and electrical wires (not shown) are located in relatively close proximity to tank installation 203. This reduces the complexity of the installation of gas pipeline and electric wires routed to engine (not shown) from tanks 204 in assembly 203, which provides an ease of installation, maintenance and service. Tank installation 203 is installed on the front face 210 of the vehicle body 209 such that the pipelines and electric wires are limited to the front portion of the body of the vehicle. For example, the pipelines and electric wire may be located contact the body 208 of vehicle only on the front face 210 right below tank installation. The decreased piping running between the engine and tanks 204 provides less exposure to the driver when fueling the refuse vehicle. The risk of gas leakage is also minimized due to the shorter piping used in accordance with exemplary embodiments of the present invention.

CNG tanks 204 can be larger in diameter than tanks used on conventional CNG vehicles. As shown in FIG. 2, this allows for 3 tanks to be used. Notably, in an alternative embodiment, 5 CNG tanks may be used according to an exemplary embodiment of the present invention. In prior art systems, CNG vehicles typically required 5 tanks, which required more components and potentially increased operating costs. In contrast to conventional tanks, compressed natural gas tanks manufactured according to exemplary embodiments of the present invention may achieve a 65-70 Diesel Gallon Equivalents (DGE) rating. Conventional compressed natural gas tanks are typically rated at only 15 DGE. One of ordinary skill in the art would appreciate that the higher DGE rating of the present invention would enable an operator to operate a vehicle for longer distances and time without the hassle of having to replace or replenish depleted tanks.

It should be appreciated that as the CNG tanks are mounted within the truck envelope, i.e., below the roof line of vehicle 200, there is less risk of damage to the truck or CNG tank apparatus 203 in the event of a roll over accident. One of ordinary skill in the art would appreciate that exemplary embodiments of the present invention present less risk to the driver and surrounding motorist, as the tank apparatus is less likely to be damaged and release gas in an accident. In contrast, prior art designs where the tanks are mounted atop the roof of a vehicle are more likely to break off, causing damage and release of gas in an accident.

In addition to CNG tanks 204, tank apparatus 203 also includes a gas pipeline (not shown) attached to each tank. The pipeline is used to deliver natural gas to the engine of vehicle 200. Each of the pipelines attached to the tanks may optionally be coupled to a manifold device (not shown). The manifold device is configured to allow a single pipeline to be attached to the exterior of apparatus 203 and deliver natural gas required by engine 205. The single pipeline attached to apparatus 203, which would be attached to face 210, could transfer natural gas from one or more of tanks 204, individually or collectively.

CNG tanks 204 may optionally be manipulated by electrical controller mechanism (not shown). In this embodiment, electrical controller would transmit signals to tanks 204 via electrical wires 206. The controller could be used to shut off one or more of tanks 204, or control the rate at which natural gas is delivered to vehicle engine 205. Alternatively, tanks 204 may be individually shut off by manual manipulation of valve mechanisms 211.

Figure 3:
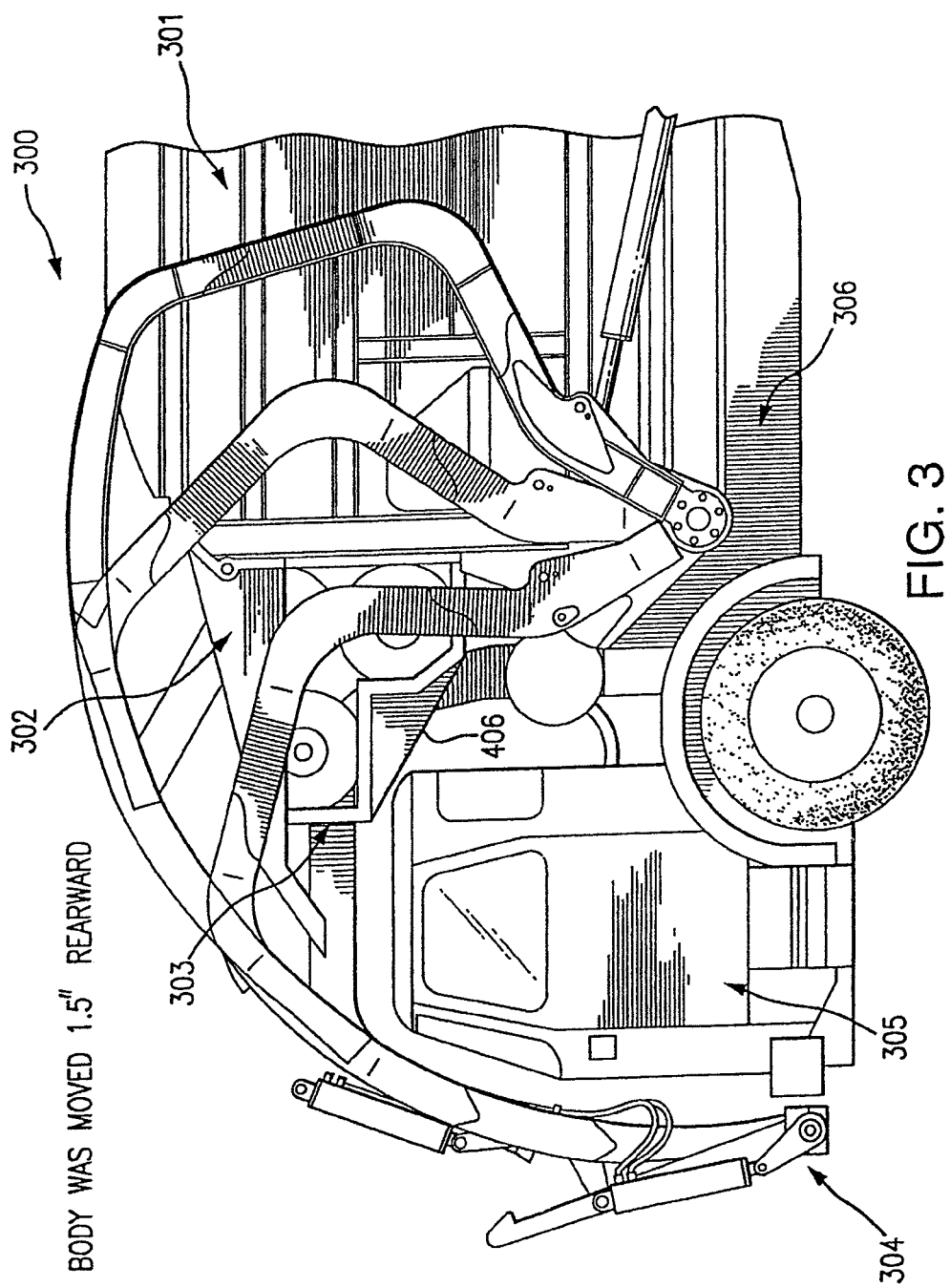
FIG. 3 is a schematic diagram of an alternative embodiment of a CNG front loading refuse route vehicle demonstrating a rearward configuration of the vehicle body.

FIG. 3 shows an alternative embodiment of a front loading refuse route vehicle 300. Body 301 is moved more rearward on frame 306 of vehicle 300. In this exemplary embodiment, body is move rearward 1.5 inches; however, one of ordinary skill in the art would appreciate that the placement of the body along vehicle chassis can only be done such that it allows the unobstructed operation of front loading mechanism 304. In this alternative embodiment, body 301 is moved rearward in an effort to more evenly distribute weight along the frame of vehicle 300. Notably, the movement of front loading mechanism is not obstructed when emptying the contents of a refuse receptacle into the body 301 of vehicle 300. CNG tank apparatus 303 is configured to fit with cab protector 302. According to exemplary embodiments of the present invention, apparatus 303 is configured to be retrofitted with conventional cab protectors. Thus, no further operator investment is necessary in order to implement CNG tank design and method according to the present invention. Front loader mechanism is designed to pick up a refuse receptacle (not shown), move it rearward over tank apparatus 303, and place contents of receptacle into the vehicle's body 301.

Figure 4A:
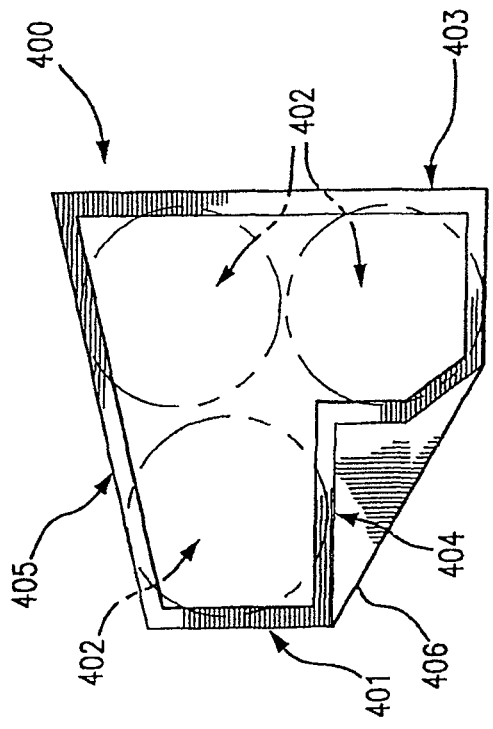
FIG. 4A is an alternative embodiment of a CNG tank apparatus in accordance with an exemplary aspect of the invention.
Figure 4:
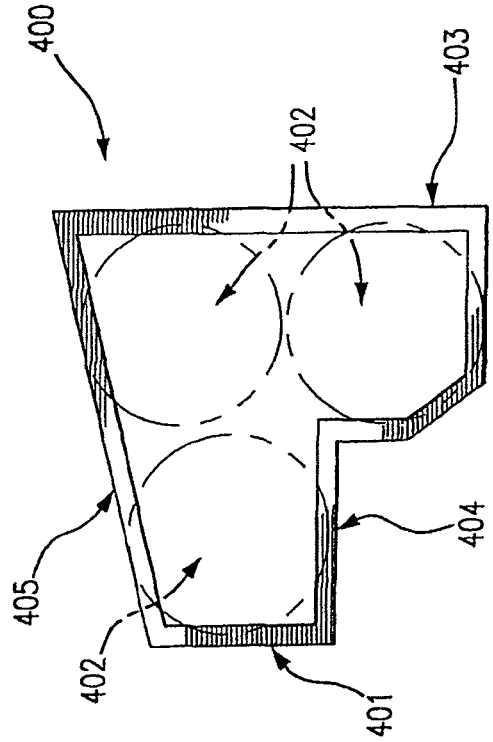
FIG. 4 is an embodiment of a CNG tank apparatus in accordance with an exemplary aspect of the invention.

FIG. 4 shows CNG tank apparatus 400. As shown, apparatus 400 comprises a compartment to house a plurality of CNG tanks 402. In an exemplary embodiment apparatus 400 may be made of a various materials. For example, apparatus 400 can comprise metals such as steel aluminum, magnesium or composite materials. However, it should be noted that any material, suitable to achieve the goals of the present invention, may be used. In this embodiment, apparatus 400 is configured to house three CNG tanks. However, as previously noted, CNG tank apparatus 400 can be configured to house a desired number of tanks. Accordingly, it should be appreciated that the vehicle is able to travel for longer distances with the use of additional CNG tanks.

As shown, frame structure 401 consists of a plurality of members that configures such that it houses CNG tanks 402. Canisters 402 are disposed longitudinally within structure 401. Valve mechanisms (not shown) provide for the flow of compressed natural gas to be manually and or electronically manipulated, e.g., turned on or off. Also, pipe lines (not shown) are connected to CNG tanks in order to deliver natural gas to the associated vehicle. Controller mechanism determines the rate at which natural gas flows from the CNG tanks. Accordingly, natural gas is delivered to the engine of the vehicle, which propels the vehicle. Alternatively, an electronic controller mechanism may be used to determine which of CNG tanks to power the vehicle, or the rate at which the compressed natural gas is delivered to the engine of the vehicle. This allows the user to conserve gas in a selected number of CNG tanks for emergency situations, e.g., depletion of natural gas from the operational CNG tank.

Figure 1:
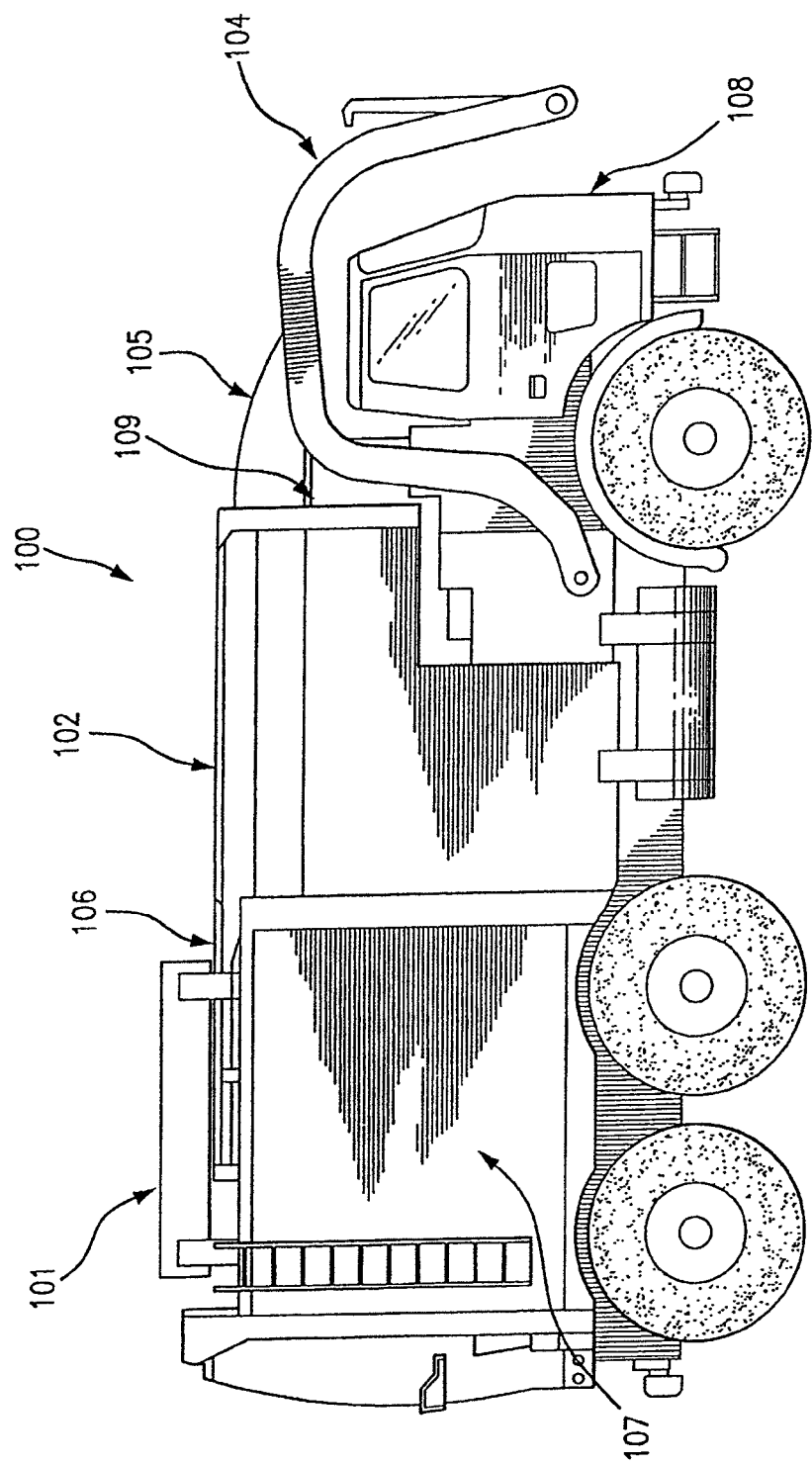
FIG. 1 illustrates a conventional CNG front loading refuse route vehicle.

It should be appreciated that back wall 403 of frame structure is configured to attach to the front face of vehicle body. See e.g., 210 of FIG. 2. Bottom portion 404 of frame structure 400 is designed to fit over vehicle cab. It should be appreciated that structure 400 can be configured to any appropriate layout and shape that would lead to minimal air resistance. According to an exemplary embodiment of the present invention, structure 401 is attached to the body of vehicle such that it is below the roofline of vehicle and behind the cab. Additionally, structure is designed such that it may be retrofitted to couple to cab liners known currently in the art. For example, the top portion 405 of structure will be mounted beneath cab liner, in hollowed portion. See e.g., 105 of FIG. 1. As the frame structure may be retrofitted to the current cab liners, exemplary embodiments of the present invention allow for user implementation without the need to purchase additional components to replace existing non-CNG tank components.

Alternatively, as shown in FIG. 4A, apparatus 400 may have a solid portion 406 below bottom portion 404. Furthermore FIG. 3 shows solid portion 406 can have a sloped configuration, in which a portion is above cab 305, and the lowest portion is attached to the bottom portion of assembly 303. Solid portion 406 prevents air from entering beneath tank structure and between cab 305 and body 301 as vehicle 300 travels. This provides increased fuel efficiency as aerodynamic drag created by air gathering between the cab and body of vehicle is minimized. It should be appreciated that solid portion 406 may be used in any embodiment of the present invention.

Figure 5A:
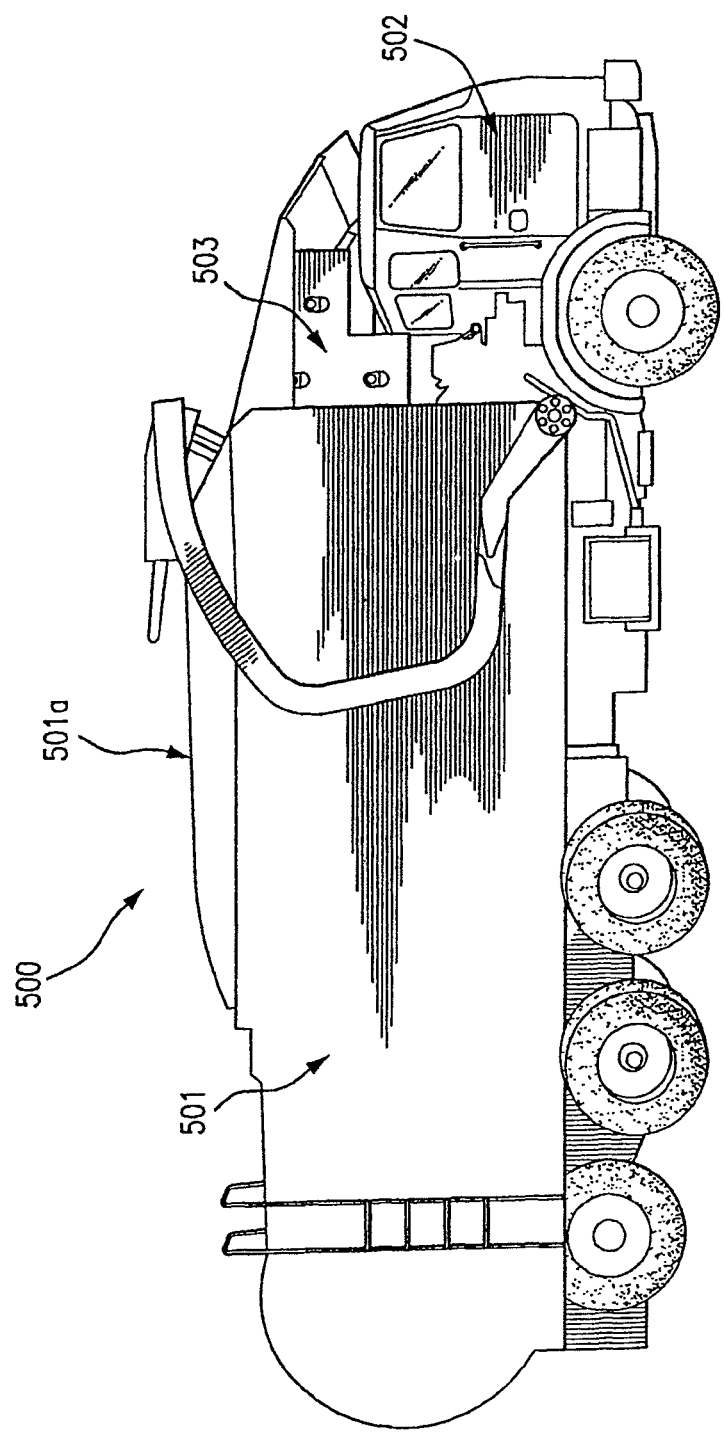
FIGS. 5A-F are embodiments of a front loading vehicle in accordance with exemplary aspects of the present invention.

FIG. 5A demonstrates a front loading refuse route vehicle designed according to exemplary embodiments of the present invention. Vehicle 500 comprises cab 502 and body 501. Vehicle 500 is propelled by the delivery of natural gas to its engine. Natural gas is delivered to the engine from CNG tanks housed in apparatus 503.

Figure 5B:
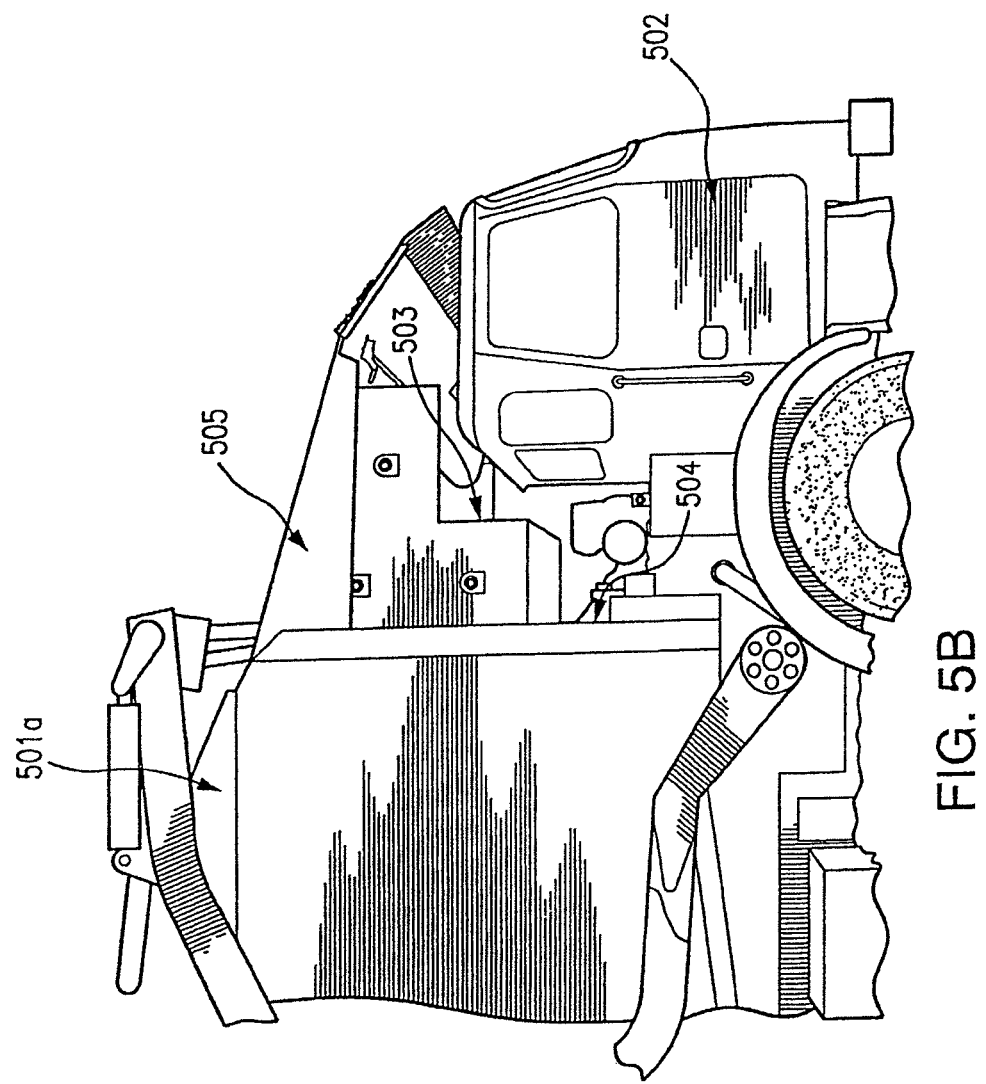

As shown in FIG. 5B, apparatus 503, which houses three compressed natural gas tanks (not shown), is designed to be installed between cab 502 and body 501. More specifically, apparatus 503 is mounted to the front face 504 of body 501. Apparatus 503 is also mounted below cab protector 505, which serves to prevent damage to the cab 502 in the event that a refuse container is disengaged from front loading mechanism (not shown) during operation. Cab protector 505 and apparatus 503 are mounted to body 501 below roofline 501a of vehicle. The location of cab protector 505 and apparatus 503 decreases drag force created by vehicle 500 as it travels. The decreased drag force increases fuel efficiency.

It should be appreciated that previous designs of front loading refuse route vehicles installed CNG tanks on the roof of vehicle bodies, as heretofore there was not an apparatus design capable of being mounted in the limited area between the cab and body of a vehicle. Notably, a housing apparatus for prior art designs of CNG tanks would have required the vehicle body, e.g., 501 to be moved too far rearward on vehicle chassis. Relocation of the vehicle body too far rearward would prevent normal operation of front loading mechanism, as it would not be able to clear vehicle cab when hoisting a refuse container. Additionally, relocation of the body could cause imbalance in weight distribution along the vehicle.

Figure 5C:
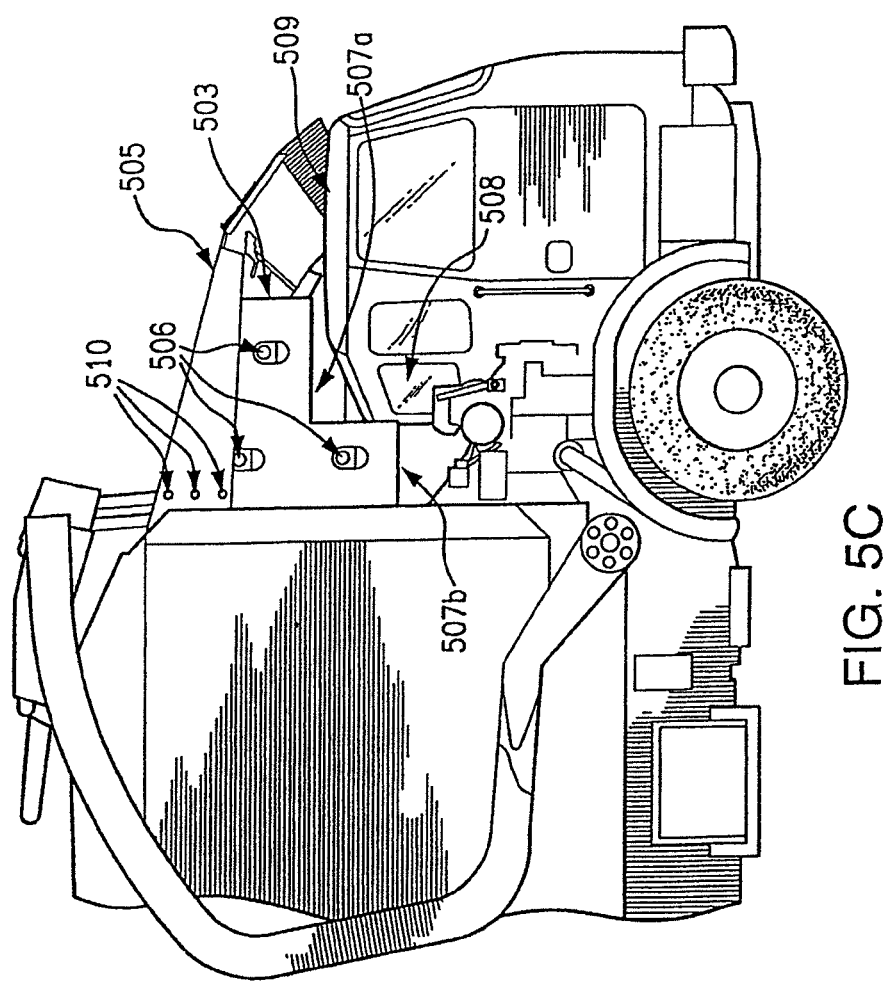

FIG. 5C shows a more detailed depiction of tank apparatus 503 installed according to exemplary embodiments of the present invention. As shown, bottom face 507a sits above, but not in contact with roof 509 of cab. Also, top face (not shown) of apparatus 503 sits below and is adjacent cab liner 503. Cab liner 503, which is known in the art, is mounted via bolts 510 to front face 504 of vehicle body. Apparatus 503 is affixed to the front face 504 of body via bolts (not shown), or any other suitable means to attach the apparatus to the vehicle body. It should be appreciated that apparatus 503 is designed to retrofit, i.e., sit below and couple to, conventional cab liners, e.g., 505. Furthermore, bottom face 507b is designed to not obstruct rear cab window 508. This allows vehicle operator to have an unobstructed view of the vehicle body operations. For example, the operator can look through rear window 508 to ensure that refuse loaded in body is being compacted in a normal fashion.

Figure 5D:
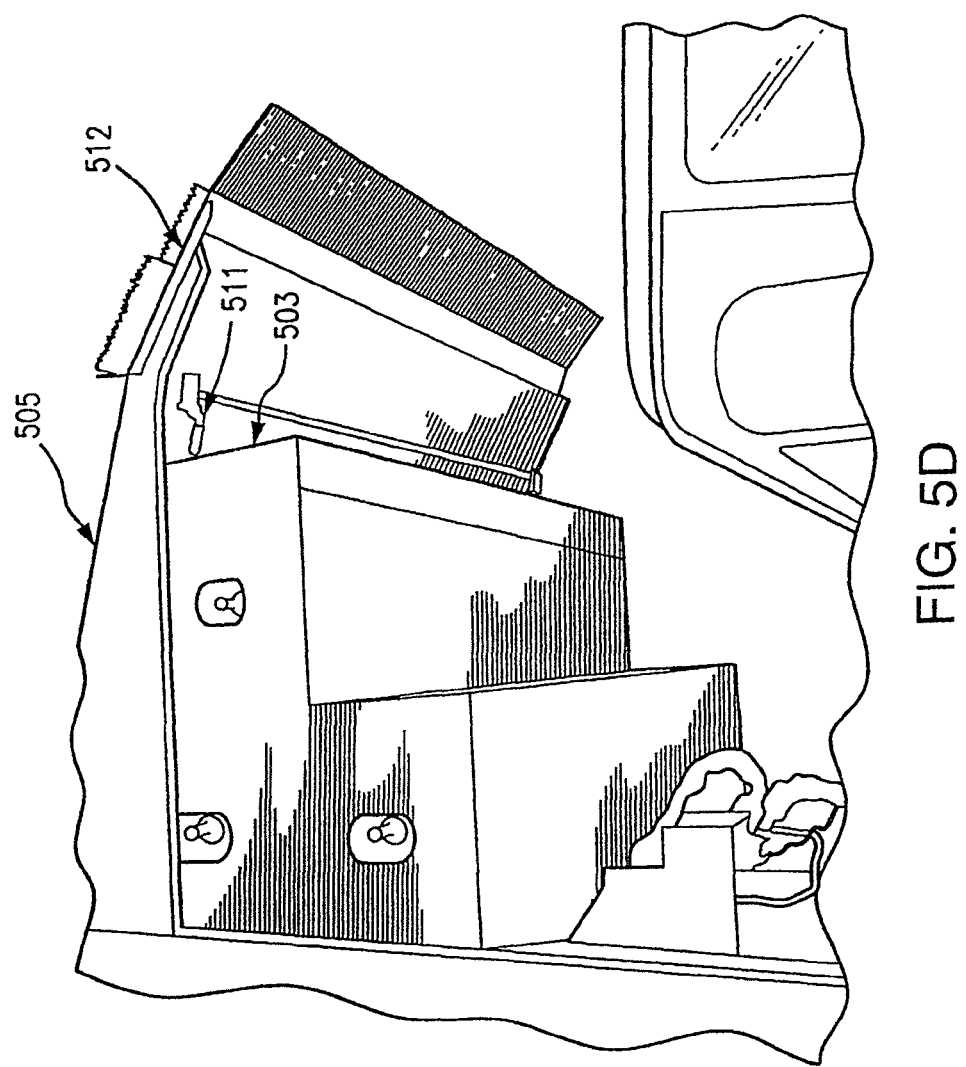

FIG. 5D demonstrates a more detailed view of how tank apparatus 503 is configured to fit within currently used cab protector. The interior of cab protector 505 is hollow (not shown). As shown, apparatus 503 is at least partially disposed within hollowed portion of cab protector 505. Apparatus is designed to easily fit with cab protector 505. For example, apparatus 503 is installed to sit on interior side of lever 511. This allows for the unobstructed movement of lever 511, which is used to manipulate the position of the front portion 512 of cab protector 512. In accordance with movement of lever 511, a varying portion of the cab's roof 509 may be covered by the front portion of cab protector 512.

Figure 5E:
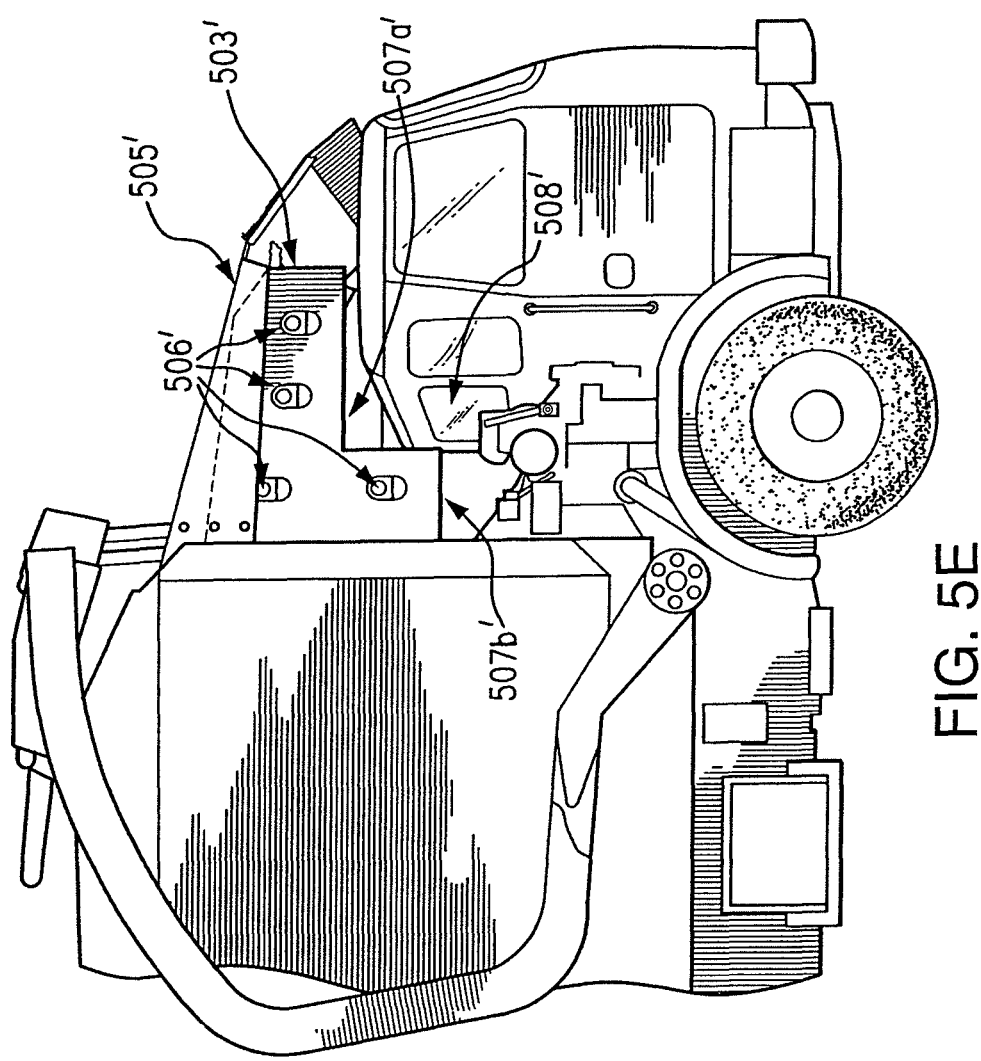
Figure 5F:
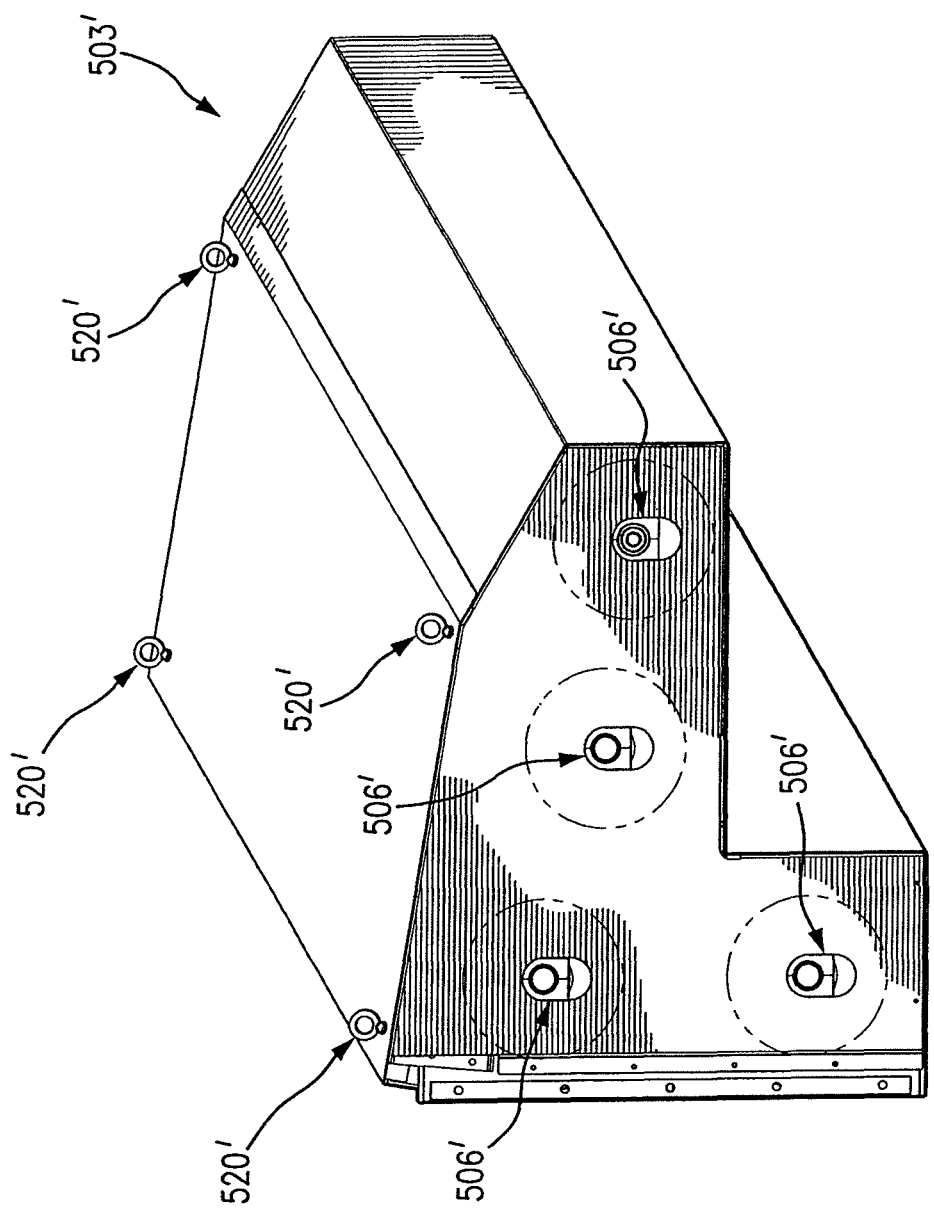

FIGS. 5E and 5F show an alternative embodiment of the front loading vehicle design according to present invention. Apparatus 503', which is designed to fit below cab protector 505', includes bottom face 507a', which sits above the cab of vehicle. Apparatus 503' also includes bottom face 507b', which is positioned such that window 508' of vehicle is not obstructed. Although apparatus 503' is configured for four CNG tanks 506', it should be appreciated that apparatus 503' can be configured to accommodate any number of CNG tanks. Additionally, FIG. 5F shows a side view of the apparatus 503'. Notably, lift eyes 520' are configured such that the entire apparatus 503' may be hoisted. For example, lift eyes 520' may be engaged with a lifting mechanism (not shown) to hoist apparatus 503' during the manufacturing process or during service of the apparatus. Lift eyes 520' may be located in each corner of top panel 525'. Alternatively, lift eyes 520' may be located in any configuration such that the top panel 525' is secured to apparatus 503'. One of ordinary skill in the art would appreciate that lifting eyes 520' may be implemented in any apparatus configuration, regardless the number of CNG tanks housed within.

Figure 1A:
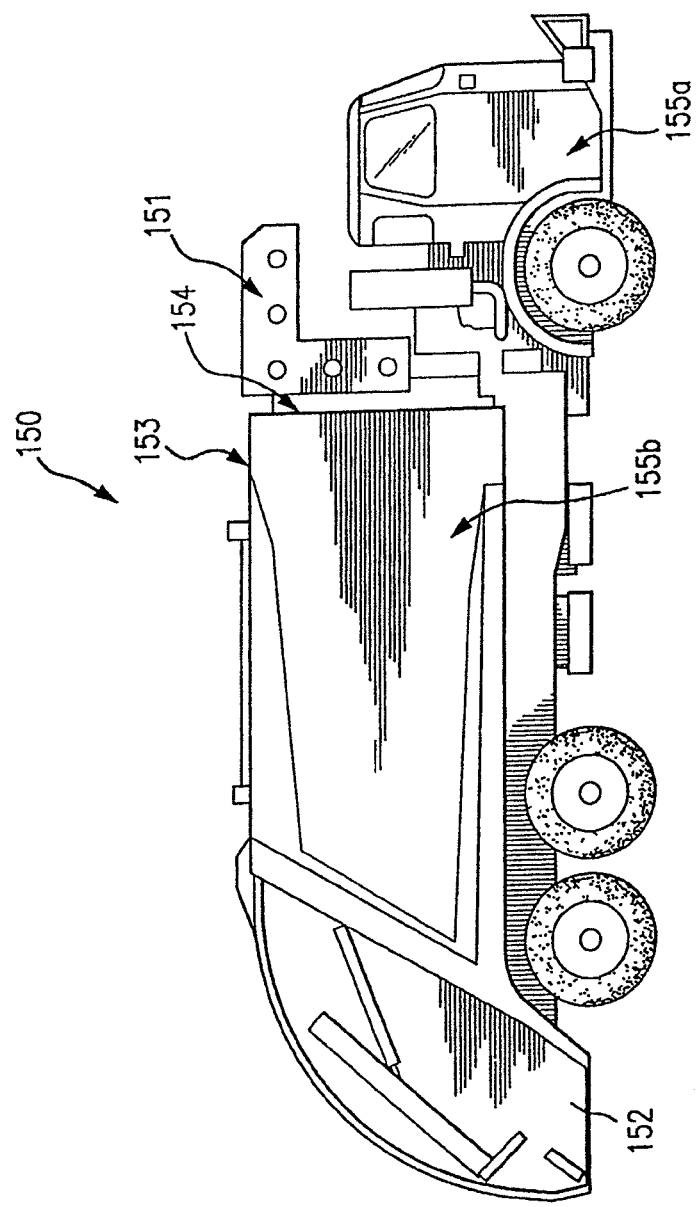
FIG. 1A illustrates a conventional CNG rear loading refuse route vehicle.
Figure 1B:
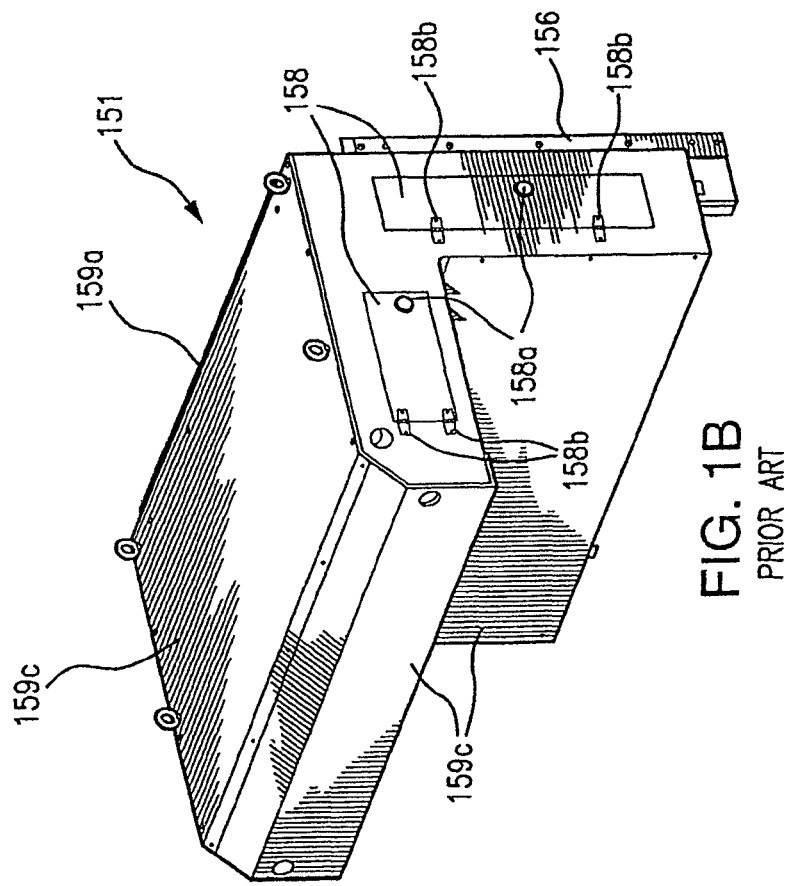
FIG. 1B illustrates a tank enclosure/tank apparatus of a conventional real loading refuse route vehicle.

Although exemplary embodiments of the present invention are optimized for use on a front loading refuse vehicle, the housing apparatus may be used for a conventional rear loading vehicle. In the event that present invention's housing apparatus is used on a rear loading vehicle powered by natural gas, the existing tank apparatus/tank enclosure will first need to be removed. For example, tank enclosure 151 of the conventional rear loading vehicle shown in FIG. 1A would be removed from vehicle 150 prior to installation of housing apparatus, e.g., 400 of FIG. 4. Apparatus 400 may then be attached to front face 154 of vehicle 150. As discussed in other embodiments, apparatus 400 would be installed below roofline 153 and behind the cab 155a in order to minimize drag force during vehicle operation and thereby increase fuel efficiency. Thus, apparatus 400 would be installed in a position lower than that of tank enclosure 151 in the conventional rear loading vehicle design.

The above-described features may be implemented in combination with each other to provide various exemplary embodiments in accordance with the invention.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

The invention claimed is:

1. A method of installing a plurality of compressed natural gas (CNG) tanks on a vehicle comprising:
 a. providing an apparatus including a frame to house the plurality of CNG tanks;
 b. installing the plurality of CNG tanks in the interior of the apparatus;
 c. installing the apparatus:
   on the front face of a body of the vehicle,
   below a roofline of the vehicle,
   in a space between a cab and the body of the CNG powered vehicle,
   and attached to a cab protector that prevents falling objects from damaging the cab;
 d. connecting the CNG tanks to an engine of the vehicle; and e. electrically connecting the CNG tanks to a controller of the vehicle.

2. The method according to claim 1, wherein a substantial portion of the apparatus is located behind the cab of the vehicle.

3. The method according to claim 1, wherein the cab protector apparatus is attached to the body of the vehicle.

4. The method according to claim 1, wherein the plurality of CNG tanks comprises at least three tanks.

5. The method of claim 1, further comprising transporting gas from the plurality of CNG tanks to the engine of the vehicle via at least one pipeline.

6. The method of claim 1, further comprising providing an electrical connection between the plurality of CNG tanks and a control mechanism of the vehicle.

7. The method according to claim 5, wherein the apparatus is installed such that it is located proximate the engine of the vehicle.

8. The method according to claim 6, wherein the apparatus is installed such that it is located proximate the controller of the vehicle.

9. The method of claim 1, further comprising using a manifold device to transfer natural gas from CNG tanks.

* * * * *